United States Patent
Giles et al.

(10) Patent No.: US 11,026,083 B2
(45) Date of Patent: Jun. 1, 2021

(54) IDENTIFICATION AND USER NOTIFICATION OF MISMATCHED DEVICES

(71) Applicant: Apple Inc., Cupertino, CA (US)

(72) Inventors: Michael Jason Giles, San Jose, CA (US); Ariane Cotte, San Francisco, CA (US); Sriram Hariharan, San Jose, CA (US); Robert D. Watson, Menlo Park, CA (US); Sarang S. Ranade, San Jose, CA (US); David C. Graham, San Jose, CA (US)

(73) Assignee: Apple Inc., Cupertino, CA (US)

( * ) Notice: Subject to any disclaimer, the term of this patent is extended or adjusted under 35 U.S.C. 154(b) by 244 days.

(21) Appl. No.: 16/143,745

(22) Filed: Sep. 27, 2018

(65) Prior Publication Data

US 2020/0107184 A1 Apr. 2, 2020

(51) Int. Cl.
| | |
|---|---|
| *H04R 1/10* | (2006.01) |
| *H04W 8/22* | (2009.01) |
| *H04W 24/00* | (2009.01) |
| *G06F 9/54* | (2006.01) |
| *H04M 1/72412* | (2021.01) |
| *H04W 92/18* | (2009.01) |

(52) U.S. Cl.
CPC .............. *H04W 8/22* (2013.01); *G06F 9/542* (2013.01); *H04M 1/72412* (2021.01); *H04W 24/00* (2013.01); *H04W 92/18* (2013.01)

(58) Field of Classification Search
CPC ......... G10K 2210/1081; H04M 1/6058; H04R 1/10; H04R 5/0335
See application file for complete search history.

(56) References Cited

U.S. PATENT DOCUMENTS

| | | | |
|---|---|---|---|
| 7,924,161 B1 * | 4/2011 | Spindel | G06K 7/0008 340/572.4 |
| 9,565,255 B2 | 2/2017 | Kapoor | |
| 9,949,015 B1 | 4/2018 | Minoo | |
| 10,042,595 B2 | 8/2018 | Behzadi | |
| 2003/0231622 A1 * | 12/2003 | Gilchrist | H04M 7/1245 370/352 |
| 2008/0287062 A1 | 11/2008 | Claus | |
| 2008/0298606 A1 * | 12/2008 | Johnson | H04R 1/1091 381/74 |
| 2010/0097237 A1 * | 4/2010 | Christiansen | G08B 13/1427 340/686.6 |
| 2011/0116643 A1 * | 5/2011 | Tiscareno | H04R 5/033 381/58 |
| 2013/0266152 A1 * | 10/2013 | Haynie | H04R 5/033 381/80 |

(Continued)

FOREIGN PATENT DOCUMENTS

CN 108174459 A 6/2018

*Primary Examiner* — Rafael Pérez-Gutiérrez
*Assistant Examiner* — Xiang Zhang
(74) *Attorney, Agent, or Firm* — Kowert, Hood, Munyon, Rankin & Goetzel, P.C.

(57) ABSTRACT

This document describes techniques for detecting and providing user notification of mismatched devices. A device mismatch of a pair of wireless devices may be detected. A wireless indication of the device mismatch may be provided to another wireless device. That wireless device may provide a user notification that the pair of wireless devices are mismatched.

20 Claims, 7 Drawing Sheets (56) References Cited

U.S. PATENT DOCUMENTS

| | | | |
|---|---|---|---|
| 2015/0137948 A1* | 5/2015 | Yap | G08B 21/0258 |
| | | | 340/10.1 |
| 2015/0295901 A1* | 10/2015 | Woodward | H04W 12/04 |
| | | | 713/168 |
| 2016/0073256 A1* | 3/2016 | Hwang | H04W 12/04 |
| | | | 370/329 |
| 2016/0165381 A1 | 6/2016 | Kapoor | |
| 2016/0360350 A1* | 12/2016 | Watson | H04L 67/16 |
| 2017/0293577 A1 | 10/2017 | Gomzin | |
| 2017/0311368 A1* | 10/2017 | Kandur Raja | H04W 4/80 |
| 2018/0199397 A1* | 7/2018 | Skillermark | H04W 76/27 |

\* cited by examiner

| Byte | Value | Field |
|---|---|---|
| 0 | | Advertising struct length |
| 1 | 0xFF | Manufacturer data |
| 2 | 0x4C | LSB Vendor ID |
| 3 | 0x00 | MSB Vendor ID |
| 4 | 0x07 | Type proximity pairing |
| 5 | | Length |
| 6 | 0x02 | SubType: Mismatch ADV |
| 7 | | LSB PID |
| 8 | | MSB PID |
| 9 | | Status1<br>9.0: UTP connected<br>9.1-2: Primary location<br>9.3-4: Secondary location<br>9.5: Bud side<br>9.6: Bud role<br>9.7: OOB mode |
| 10 | | Battery Info 1<br>10.0-10.3: Case Battery 10% accuracy<br>10.4-10.7: Other Battery 10% accuracy |
| 11 | | Battery Info 2<br>10.0-11.3: Case Battery 10% accuracy<br>11.4: My battery state – discharging (0) or charging (1)<br>11.5: Other battery state – discharging (0) or charging (1)<br>11.6: Case battery state – discharging (0) or charging (1)<br>11.7: Reserved |
| 12 | | Status3<br>12.0-12.2: lid open count<br>12.3: lid state (0=open/unknown, 1=closed)<br>12.4: case version (0=B235, 1=B435)<br>12.5-6: case LED color (0(00)=off, 1(01)=green, 2(10)=orange, 3(11)=white)<br>12.7: case LED status (0=solid, 1=blinking) |
| 13 | | Bud color |
| 14 | | Reserved |
| [15:20] | | My RPA |
| [21:26] | | Other bud's RPA |
| [27:28] | | Other bud's PID |
| 29 | | Reserved |
| 30 | | Reserved |

IDENTIFICATION AND USER NOTIFICATION OF MISMATCHED DEVICES

FIELD

The present disclosure relates to wireless devices, including to techniques for wireless devices to provide user notification of mismatched devices.

DESCRIPTION OF THE RELATED ART

Wireless communication systems are rapidly growing in usage. Additionally, there exist numerous different wireless communication technologies and standards. Some examples of wireless communication standards include GSM, UMTS (WCDMA), LTE, LTE Advanced (LTE-A), 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others. Bluetooth is a family of wireless communication technologies typically used for short-range communication. The Bluetooth family encompasses 'Classic Bluetooth' (also referred to herein as "Classic BT" or simply "BT") as well as 'Bluetooth Low Energy' (referred to herein as "BLE").

SUMMARY

Embodiments are presented herein of systems, apparatuses, and methods for wireless devices to provide user notification of mismatched devices.

Devices that are generally linked as part of their basic function and commonly operated together as a pair can sometimes end up mixed with devices of different product generations or that belong to different owners, e.g., if such devices are similar in appearance, and may be difficult to distinguish visually or otherwise.

According to the techniques described herein, it may be possible to detect when such a device mismatch occurs between a pair of wireless devices, e.g., using wireless communication between the wireless devices and/or communication with one or more other available devices. Additionally, techniques are described relating to providing user notification of the device mismatch, for example by one or more of the mismatched devices, and/or by another available wireless device (e.g., that may have additional/different user interface elements relative to the mismatched wireless devices).

Such techniques may thus help reduce the likelihood that device mismatches occur, and/or help facilitate resolution of such device mismatches, at least in some instances. This may be particularly useful if the mismatched devices are unable to function together or otherwise would not provide their full and/or optimal functionality while mismatched.

The techniques described herein may be implemented in and/or used with a number of different types of devices, including but not limited to cellular phones, tablet computers, portable computers, desktop computers, accessory and/or wearable computing devices, portable media players, remote controls, wireless speakers, set top box devices, television and/or media systems, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the preferred embodiment is considered in conjunction with the following drawings, in which.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in the present disclosure:

Memory Medium—Any of various types of non-transitory computer accessible memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums that may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™ Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 1:
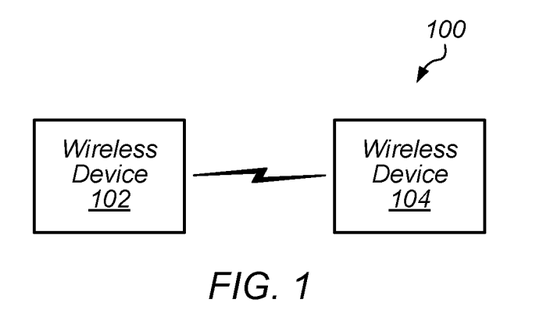
FIGS. 1-2 illustrate exemplary wireless communication systems.
Figure 2:
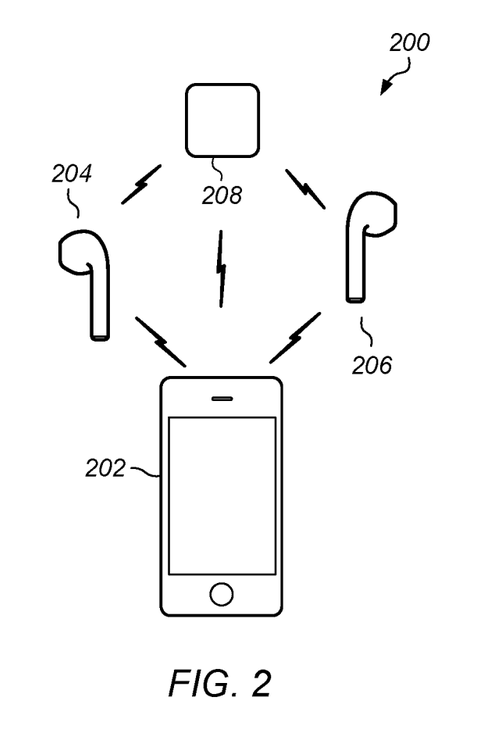

FIGS. 1-2—Communication System

FIG. 1 illustrates an exemplary (and simplified) wireless communication system 100 in which aspects of this disclosure may be implemented. It is noted that the system of FIG. 1 is merely one example of a possible system, and embodiments of this disclosure may be implemented in any of various systems, as desired.

As shown, the exemplary wireless communication system includes a ("first") wireless device 102 in communication with another ("second") wireless device 104. The first wireless device 102 and the second wireless device 104 may communicate wirelessly using at least one wireless communication technique.

As one possibility, the first wireless device 102 and the second wireless device 104 may communicate using Bluetooth (BT) wireless communication and/or techniques based on BT wireless communication. In such a context, the first wireless device 102 may be referred to as the master (or "central") device 102 while the second wireless device 104 may be referred to as the slave (or "peripheral") device 104 (e.g., the 'master' and 'slave' designations may be specific to the roles of the devices 102, 104 with respect to BT communication). One or both of the master device 102 and the slave device 104 may also be capable of communicating via one or more additional wireless communication protocols, such as any of Bluetooth Low Energy (also referred to as "BLE"), IEEE 802.11 (Wi-Fi), near field communication (NFC), GSM, UMTS (WCDMA, TDSCDMA), LTE, LTE-Advanced (LTE-A), 5G NR, 3GPP2 CDMA2000 (e.g., 1×RTT, 1×EV-DO, HRPD, eHRPD), GPS, etc.

As shown, as one possibility a single master (e.g., primary) device 102 may communicate with a single slave (e.g., secondary) device 104 at a particular time. Note that it may also be possible for a master device 102 to communicate with multiple slave devices 104. The master device 102 may be any of a variety of types of devices. As one possibility, the master device 102 may be a substantially portable wireless user equipment (UE) device, such as a smart phone, hand-held device, a wearable device, a tablet, or virtually any type of wireless device. As another possibility, the master device 102 may be a substantially stationary device, such as a set top box, media player (e.g., an audio or audiovisual device), gaming console, or any of a variety of other types of device.

The slave device 104 may also be any of various types of devices. Some examples might include hearing aids, headphones, speakers, remote control devices, microphones, headsets, various types of sensors, watches and other wearable computing devices, smart storage cases, etc. In some instances, the master device 102 and the slave device 104 may be the same type of device, such as might be the case for a pair of devices configured to be used together. Note that some devices may be configured to act as either a master device or a slave device, while others may be configured to act only as a master device, or only as a slave device.

Each of the master device 102 and the slave device 104 may include wireless communication circuitry configured to facilitate the performance of wireless communication, which may include various digital and/or analog radio frequency (RF) components, a processor that is configured to execute program instructions stored in memory, a programmable hardware element such as a field-programmable gate array (FPGA), and/or any of various other components. The master device 102 and/or the slave device 104 may perform any of the method embodiments described herein, or any portion of any of the method embodiments described herein, using any or all of such components.

Each of the master device 102 and the slave device 104 may include one or more antennas for communicating using one or more wireless communication protocols. In some cases, one or more parts of a receive and/or transmit chain may be shared between multiple wireless communication standards; for example, a device might be configured to communicate using either of Bluetooth or Wi-Fi using partially or entirely shared wireless communication circuitry (e.g., using a shared radio or at least shared radio components). The shared communication circuitry may include a single antenna, or may include multiple antennas (e.g., for MIMO) for performing wireless communications. Alternatively, a device may include separate transmit and/or receive chains (e.g., including separate antennas and other radio components) for each wireless communication protocol with which it is configured to communicate. As a further possibility, a device may include one or more radios or radio components which are shared between multiple wireless communication protocols, and one or more radios or radio components which are used exclusively by a single wireless communication protocol. For example, a device might include a shared radio for communicating using either of LTE or NR (or LTE or CDMA2000 1×RTT, or LTE or GSM, etc.), and separate radios for communicating using each of Wi-Fi and Bluetooth. Other configurations are also possible.

The slave device 104 may include one or more microphones and/or one or more speakers, e.g., in order to receive and/or render audio. For example, the slave device 104 might include one or more microphones for picking up audio in order to provide audio input to the master device 102, one or more speakers for rendering audio received as audio output from the master device 102, or may include both microphone and speaker for use in conjunction with any of input, output, or bi-directional communication with the master device 102. The master device 102 may similarly include one or more microphones and/or one or more speakers. Note additionally that aspects of the present disclosure may also be implemented in scenarios in which one or both of the master device 102 and the slave device 104 do not include speakers and/or microphones; for example, while audio data may commonly be communicated using BT communication, any of various other types of data may also or alternatively be communicated using BT and other wireless communication technologies.

As previously noted, aspects of this disclosure may be implemented in conjunction with the wireless communication system of FIG. 1. For example, at least one of the wireless devices 102, 104 may be a device that is configured for use with a matching device, or may be associated with a device that is configured for use with a matching device, and one or both of the wireless devices 102, 104 may implement some or all of those features described subsequently herein with respect to FIGS. 5-14, such as detecting and/or providing user notification of mismatched devices. By utilizing such techniques (and/or other techniques described herein), the wireless device(s) may (at least according to some embodiments) be able to effectively notify users when mismatched devices are detected, potentially reducing the likelihood that errors or unexpected behavior might occur due to devices being mismatched.

As one example of a possible wireless communication system, FIG. 2 illustrates a system 200 in which some or all of a wireless user equipment (UE) device 202 (e.g., a smart phone), a pair of earbud speaker devices 204, 206, and a storage case 208 are in communication with each other. In such an exemplary implementation, the UE 202 may provide audio data (e.g., audio from a phone call, voice or video chat application, media player application, or any other audio) as an output audio stream to the devices 204, 206 via BT communication as described herein. However, if the devices 204, 206 are mismatched, this could prevent or otherwise negatively impact playback of such audio data.

Accordingly (e.g., to avoid or mitigate such effects) one or more of the wireless devices 202, 204, 206, 208 may implement some or all of those features described subsequently herein with respect to FIGS. 5-14, such as detecting and/or providing user notification of mismatched devices.

Note that while the exemplary wireless communication systems illustrated in FIGS. 1-2 represent possible scenarios in which aspects of the present disclosure may be implemented, it should be recognized that the techniques described herein may also or alternatively be implemented in a variety of alternate scenarios, in conjunction with a variety of other device combinations, as will be apparent to those skilled in the art.

Figure 3:
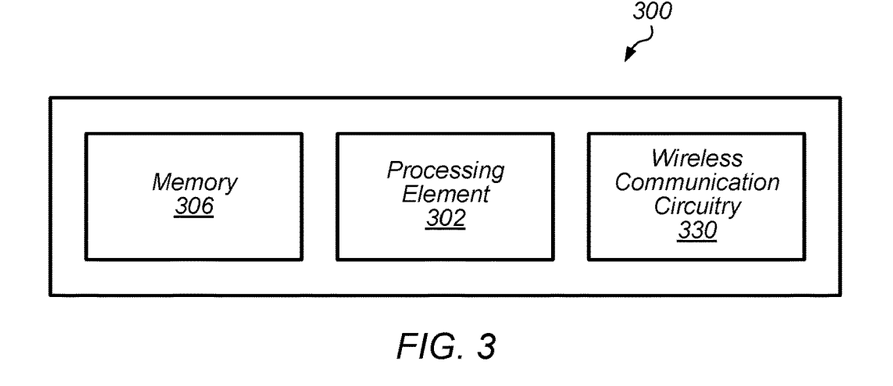
FIGS. 3-4 illustrate exemplary block diagrams of wireless devices.
Figure 4:
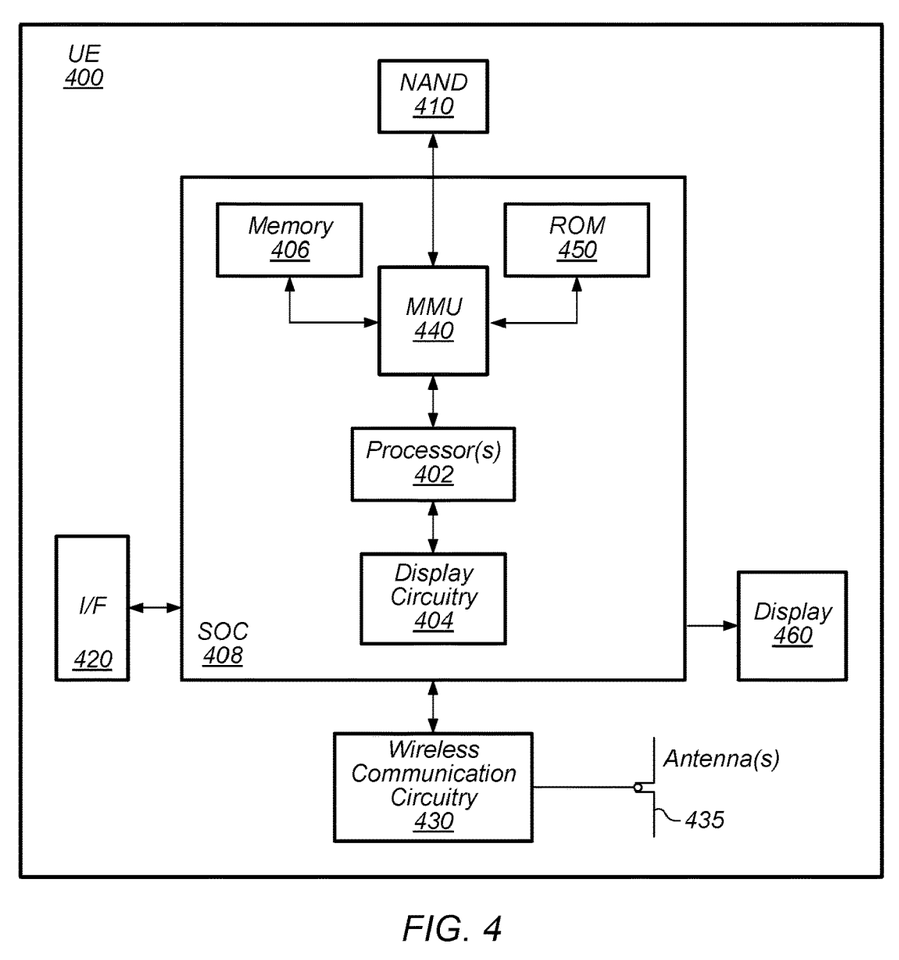

FIGS. 3-4—Exemplary Device Block Diagrams

FIG. 3 illustrates an exemplary wireless device 300 that may be configured for use in conjunction with various aspects of the present disclosure. The device 300 may be any of a variety of types of device and may be configured to perform any of a variety of types of functionality. The device 300 may be a substantially portable device (a mobile device), such as a mobile phone, a personal productivity device, a computer or a tablet, a handheld gaming console, a portable media player, a headphone/earphone, a smart storage device, etc. Alternatively, the device 300 may be a substantially stationary device, such as a desktop computer, set top box, television, or other type of substantially stationary device. The device 300 may be configured to operate as a master or central device in a Bluetooth wireless communication scheme, and/or may be configured to operate as a slave or peripheral device in a Bluetooth wireless communication scheme.

As shown, the device 300 may include a processing element 302. The processing element may include or be coupled to one or more memory elements. For example, the device 300 may include one or more memory media (e.g., memory 306), which may include any of a variety of types of memory and may serve any of a variety of functions. For example, memory 306 could be RAM serving as a system memory for processing element 302. Other types and functions are also possible.

Additionally, the device 300 may include wireless communication circuitry 330. The wireless communication circuitry may include any of a variety of communication elements (e.g., antenna for wireless communication, analog and/or digital communication circuitry/controllers, etc.) and may enable the device to wirelessly communicate using one or more wireless communication protocols.

Note that in some cases, the wireless communication circuitry 330 may include its own processing element (e.g., a baseband processor), e.g., in addition to the processing element 302. For example, the processing element 302 might be an 'application processor' whose primary function may be to support application layer operations in the device 300, while the wireless communication circuitry 330 might be a 'baseband processor' whose primary function may be to support baseband layer operations (e.g., to facilitate wireless communication between the device 300 and other devices) in the device 300. In other words, in some cases the device 300 may include multiple processing elements (e.g., may be a multi-processor device). Other configurations (e.g., instead of or in addition to an application processor/baseband processor configuration) utilizing a multi-processor architecture are also possible.

The device 300 may additionally include any of a variety of other components (not shown) for implementing device functionality, depending on the intended functionality of the device 300, which may include further processing and/or memory elements (e.g., audio processing circuitry), one or more power supply elements (which may rely on battery power and/or an external power source) user interface elements (e.g., display, speaker, microphone, camera, keyboard, mouse, touchscreen, etc.), and/or any of various other components.

The components of the device 300, such as processing element 302, memory 306, and wireless communication circuitry 330, may be operatively coupled via one or more interconnection interfaces, which may include any of a variety of types of interface, possibly including a combination of multiple types of interface. As one example, a USB high-speed inter-chip (HSIC) interface may be provided for inter-chip communications between processing elements. Alternatively (or in addition), a universal asynchronous receiver transmitter (UART) interface, a serial peripheral interface (SPI), inter-integrated circuit (I2C), system management bus (SMBus), and/or any of a variety of other communication interfaces may be used for communications between various device components. Other types of interfaces (e.g., intra-chip interfaces for communication within processing element 302, peripheral interfaces for communication with peripheral components within or external to device 300, etc.) may also be provided as part of device 300.

The device 300 (e.g., wireless communication circuitry 330 in conjunction with processing element 302, memory 306, and/or other components of device 300) may be configured to implement features for detecting and/or providing user notification of mismatched devices. For example, the wireless device 300 may represent an example of a possible wireless device such as illustrated in any of FIGS. 1-2, and may be capable of detecting and/or providing user notification of mismatched devices and/or implementing other features described herein with respect to FIGS. 5-14.

FIG. 4 is an exemplary block diagram illustrating details of a UE 400, which may be one possible exemplary implementation of the device 300 illustrated in FIG. 3. As shown, the UE 400 may include a system on chip (SOC) 408, which may include portions for various purposes. For example, as shown, the SOC 408 may include processor(s) 402 which may execute program instructions for the UE 400 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, wireless communication circuitry 430, connector I/F 420, and/or display 460. The MMU 440 may be configured to perform memory protection and page table translation or set up. In some embodiments, the MMU 440 may be included as a portion of the processor(s) 402.

As shown, the SOC 408 may be coupled to various other circuits of the UE 400. For example, the UE 400 may include various types of memory (e.g., including NAND flash 410), an interface 420 (e.g., for coupling to a computer system, dock, charging station, etc.), the display 460, and wireless communication circuitry 430 (e.g., for LTE, LTE-A, NR, CDMA2000, Bluetooth, Wi-Fi, GPS, etc.).

The UE 400 may be configured to communicate wirelessly using multiple wireless communication standards. In such instances, the wireless communication circuitry 430 may include radio components which are shared between multiple wireless communication standards and/or radio components which are configured exclusively for use according to a single wireless communication standard. As shown, the UE device 400 may include at least one antenna (and possibly multiple antennas, e.g., for MIMO and/or for implementing different wireless communication technologies, among various possibilities), for performing wireless communication with base stations, access points, and/or other devices. For example, the UE device 400 may use antenna(s) 435 to perform the wireless communication.

The UE 500 may also include and/or be configured for use with one or more user interface elements. The user interface elements may include any of various elements, such as display 460 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving/interpreting user input.

As described herein, the UE 400 may include hardware and software components for implementing features for detecting and/or providing user notification of mismatched devices. For example, the UE 400 may represent an example of a possible wireless device such as illustrated in any of FIGS. 1-2, and may be capable of detecting and/or providing user notification of mismatched devices and/or implementing other features described herein with respect to FIGS. 5-14. The wireless communication circuitry 430 of the UE device 400 may be configured to implement part or all of the features described herein, e.g., using various circuitry components of the wireless communication circuitry. Alternatively (or in addition), the wireless communication circuitry 430 of the UE device 400, in conjunction with one or more of the other components 402, 404, 406, 408, 410, 420, 435, 440, 450, 460, may be configured to implement part or all of the features described herein, such as the features described herein with reference to any or all of FIGS. 5-14.

Figure 5:
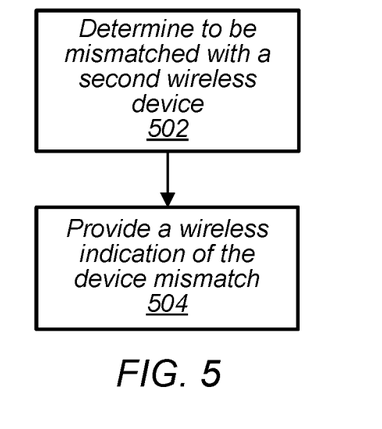
FIGS. 5-7 are flowchart diagrams illustrating exemplary methods for providing user notification of mismatched devices.
Figure 6:
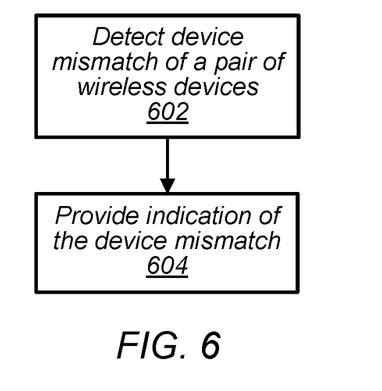
Figure 7:
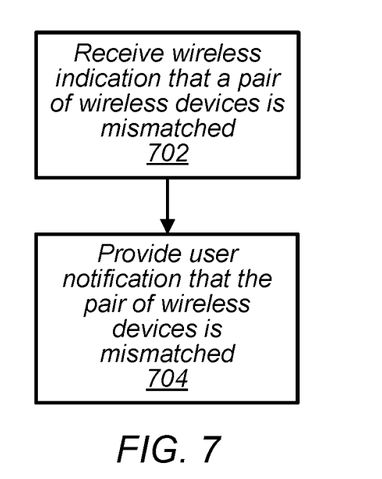

FIGS. 5-7—Flowcharts

As previously noted herein, it may be possible for at least one of two or more devices that are configured for use together, such as a pair of wireless earphones, to be mixed with one or more similar devices, such that a user may attempt to store and/or use mismatched devices together. Such a possibility may be relatively more likely when the devices have a similar (or even identical) appearance and/or have limited user interface elements with which to provide notification of such a mismatch.

In some instances, such a device mismatch may result in the mismatched pair of devices not being usable together, or otherwise providing only limited functionality (or less than full functionality) compared to the capability of a matched set or even at least one of the devices. For example, some devices of different product generations could have different hardware, firmware, and/or software, which may result in incompatibility between the product generations or otherwise limit the performance capability of the mismatched pair of devices. Further, even for a pair of devices that are technically capable of being used together, if the devices belong to different users, a user may wish to know when they are attempting to pair a device owned by the user with a device that is not owned by the user.

Accordingly, in such scenarios and/or a variety of other possible scenarios, it may be useful to provide techniques for identifying and providing user notification of such a mismatched set of devices, which may help with resolution of the device mismatch. FIGS. 5-7 are flowchart diagrams illustrating various aspects of possible methods for such device mismatch detection and user notification.

FIG. 5 is a flowchart diagram illustrating an example method for a wireless device that is mismatched with another device to detect such a mismatch and to provide an indication of the device mismatch to another device that can provide user notification of the device mismatch. The method of FIG. 5 may be implemented by a wireless user equipment (UE) device or other device capable of performing wireless communication. The method shown in FIG. 5 may be used in conjunction with any of the computer systems or devices shown in the above Figures, among other devices. Some of the method elements shown may be performed concurrently, in a different order than shown, substituted for by other elements, or may be omitted. Additional method elements may also be performed as desired. As shown, the method may operate as follows.

A first wireless device may determine that it is mismatched with a second wireless device (502). The first wireless device may detect such a device mismatch based on information received from the second wireless device and/or from a device configured to store a pair of devices, such as a smart storage device or housing. The information may include identification information for the second wireless device, such as a product identifier, a random public address (RPA) associated with the second wireless device, product generation identification information, information indicting a user/owner of the second wireless device, and/or any of various other possible types of information.

Thus, by comparing such identification information for the second wireless device with its own identification information, the first wireless device may be able to determine whether the first wireless device and the second wireless device are properly matched or are mismatched. For example, if the first wireless device and the second wireless device have different product identifiers, are of different generations, have different users and/or owners, and/or otherwise have identification information that the first wireless device is configured to recognize as indicative of a device mismatch, the first wireless device may determine that it is mismatched with the second wireless device.

Such information may be received based at least in part on being located in proximity to a device configured to store a pair of wireless devices (e.g., such as the first wireless device and the second wireless device) while the second wireless device is also located in proximity to the device configured to store a pair of wireless devices, according to some embodiments. For example, placement of the first wireless device and the second wireless device in mutual physical proximity to such a storage device may be indicative that a user believes the first wireless device and the second wireless device to be a matched pair of wireless devices. The physical proximity of the first wireless device and the second wireless device may include storage of the first wireless device and/or the second wireless device in the storage device, and/or one or more other types of physical proximity. For example, other physical contact with the storage device, or placing of or performing a gesture with the first and/or second wireless device within a certain configured range (e.g., potentially without physical contact) of the storage device, may be sufficient to trigger such information exchange, in some embodiments.

Alternatively, or in addition, one or more other triggers for such information exchange may occur. For example, physical proximity of the first wireless device with the second wireless device, or mutual physical proximity of the first wireless device and the second wireless device with another wireless device such as a smart phone, or mutual physical proximity of the first wireless device and the second wireless device to a user (e.g., in the ears of a user, in the case of earphone devices), or otherwise in an arrangement or relative proximity associated with an intended use of the first wireless device and the second wireless device, may cause provision of such information to the first wireless device, at least according to some embodiments.

The information may be provided to the first wireless device by the second wireless device, or by another device, such as a storage case with which the first wireless device and the second wireless device are physically proximate. For example, in some instances, such a storage device may provide a shared RPA advertisement to the first wireless device and the second wireless device upon detecting their mutual physical proximity to the storage device and/or on one or more other occasions after such detection. In some instances, the information received by the first wireless device may directly indicate that it is mismatched with the second wireless device. For example, the first wireless device and the second wireless device may provide identification information to the storage device, which may determine that the first wireless device and the second wireless device are mismatched, and accordingly provide an indication that the first wireless device and the second wireless device are mismatched to the first wireless device and/or the second wireless device.

The first wireless device may provide a wireless indication of the device mismatch to another ("third") wireless device (504), e.g., to facilitate user notification of the device mismatch. For example, the third wireless device may include one or more user interface elements that are capable of providing a user notification of the device mismatch, at least in some instances. The third wireless device may be a wireless device associated with the storage device, and may possibly also be associated with one or both of the first wireless device or the second wireless device. For example, as one possible scenario, the third wireless device may be a smart phone or other UE device that is associated with a pair of wireless earphones (or ear buds) and a smart storage case for the wireless earphones. In such a scenario, the UE might be configured to communicate with the associated pair of wireless earphones to render audio to a user of the UE. However, if the user attempts to use a mismatched pair of wireless earphones (e.g., such that one or both do not belong to the user, and/or are of different product generations, have different firmware versions, etc.), it is possible that the mismatched pair may have reduced functionality, e.g., may not function to the fullest capabilities of the more capable earphone of the pair.

The wireless indication may include any of various types of information. As one possibility, the wireless indication may explicitly specify that the first wireless device and the second wireless device are mismatched. As another possibility, the wireless indication may not explicitly indicate that the first wireless device and the second wireless device are mismatched, but may include information based on which the third wireless device can determine that the first wireless device and the second wireless device are mismatched. For example, the wireless indication could include any of various identification information for the first wireless device and the second wireless device sufficient to determine that the first wireless device and the second wireless device are mismatched. Note that the wireless indication may additionally include any of various other types of information, if desired, such as battery status information and/or other status information for the first wireless device and possibly the second wireless device.

Note that the wireless indication could be a message directed specifically to the third wireless device, or could be a broadcast communication provided by the first wireless device. For example, as one possibility, the wireless indication could be provided using Bluetooth Low Energy communication or another short-range protocol. In such a scenario, if the first wireless device has established a connected link with the third wireless device, the wireless indication could be a message transmitted to the third wireless device via the connected link. Alternatively, in such a scenario, if the first wireless device has not established a connected link with the third wireless device, the wireless indication could be a broadcast advertisement transmitted by the first wireless device. The information indicative of the mismatch between the first wireless device and the second wireless device may be provided in such an advertisement using any desired combination of header and/or payload information, as desired. As one possibility, a "mismatched devices" advertisement payload type could be configured, which could be used to indicate that an attempt to pair the first wireless device with a mismatched device is occurring, and to convey various information regarding the mismatched devices. Other payload types for such BLE communication to provide the wireless indication, and/or other types of wireless communication, are also possible.

Note that while FIG. 5 is presented from the perspective of one of a pair of mismatched devices, it should be noted that some or all elements of such a method could similarly be performed by the other of the pair of mismatched devices (e.g., by the second wireless device). Thus, for example, both the first wireless device and the second wireless device could determine that they are mismatched with each other, and each could provide a wireless indication to the third wireless device of the device mismatch. Alternatively, it could be the case that only one of the pair of mismatched devices (e.g., only the first wireless device) performs such a determination and provides such a wireless indication. For example, the first wireless device might be a later generation device than the second wireless device, and may perform the method of FIG. 5 while the second wireless device does not based at least in part on such a difference. As another possibility, the first wireless device might be associated with the same user/owner as the third wireless device while the second wireless device may not, and may perform the method of FIG. 5 while the second wireless device does not based at least in part on such a difference. Any of various other reasons for only one of the first wireless device or the second wireless device to provide such a wireless notification are also possible.

While detection and provision of a wireless indication of a device mismatch by one or both of the mismatched devices, such as according to the method of FIG. 5, may represent one possibility for detecting and providing an indication that a pair of wireless devices is mismatched, other (e.g., additional or alternative) options may also be possible. FIG. 6 is a flowchart diagram illustrating another such option, in which a different device may detect that a pair of wireless device is mismatched and provide an indication of the device mismatch. The method of FIG. 6 may be implemented by a wireless user equipment (UE) device or other device capable of performing wireless and/or wired communication. The method shown in FIG. 6 may be used in conjunction with any of the computer systems or devices shown in the above Figures, among other devices. Some of the method elements shown may be performed concurrently, in a different order than shown, substituted for by other elements, or may be omitted. Additional method elements may also be performed as desired. As shown, the method may operate as follows.

The device may determine that a pair of wireless devices are mismatched (602). The device may be configured to store a pair of wireless devices, and may determine that the pair of wireless devices is mismatched is based at least in part on the pair of wireless devices being stored in the device, or otherwise being in physical proximity to the device. For example, in some instances, the device may receive identification information from each wireless device of the pair of wireless devices based at least in part on each wireless device of the pair of wireless devices being in physical proximity to the device, and may determine that the identification information from each wireless device of the pair of wireless devices do not match. The information may include identification information for each of the pair of wireless devices, such as product identifiers, RPAs, product generation information, user/owner information, and/or any of various other possible types of information.

Thus, by comparing such identification information for each of the pair of wireless devices, the device may be able to determine whether the pair of wireless devices are properly matched or are mismatched. For example, if the pair of wireless devices have different product identifiers, are of different generations, have different users and/or owners, and/or otherwise have identification information that the device is configured to recognize as indicative of a device mismatch, the device may determine that the pair of wireless devices are mismatched.

The wireless device may provide an indication of the device mismatch (604), e.g., to facilitate user notification of the device mismatch. As one possibility, the device may provide the indication of the device mismatch to another wireless device associated with the wireless device (e.g., a "third" wireless device such as previously described herein with respect to FIG. 5), possibly in a wireless manner, such as via a BLE advertisement transmission. For example, the third wireless device may include one or more user interface elements that are capable of providing a user notification of the device mismatch, at least in some instances. As another possibility, the device may provide the indication (e.g., in a wired or wireless manner) of the device mismatch to one of the pair of wireless devices, which may provide a user notification of the device mismatch and/or provide a wireless indication of the device mismatch to another device, such as the third wireless device.

The indication may include any of various types of information. As one possibility, the indication may explicitly specify that the pair of wireless devices are mismatched, e.g., by using a mismatched devices advertisement payload in a scenario in which the indication is provided using a BLE advertisement transmission. As another possibility, the indication may not explicitly indicate that the pair of wireless devices are mismatched, but may include information sufficient to allow a device receiving the information to determine that the pair of wireless devices are mismatched. For example, the indication could include any of various identification information for the pair of wireless devices that may be indicative of a device mismatch between the pair of wireless devices. Note that the indication may additionally include any of various other types of information, if desired, such as battery status information and/or other status information for the one or both of the pair of wireless devices.

In some instances, the device may also be capable of providing a user notification that the pair of wireless devices is mismatched. For example, even if the device is a storage device with limited user interface elements, it may be possible for the device to flash a light emitting diode (LED) or emit a sound to indicate the device mismatch, at least according to some embodiments. Such a notification may be useful to draw the attention of a user to a possible problem, e.g., even if the granularity of detail provided by the notification may be more coarse than could be provided by a device with greater user interface capability, in some instances. For example, such a notification may increase the likelihood that the user may investigate the nature of the potential problem, whether via a device with greater user interface capability, or by inspecting the mismatched devices, or otherwise.

In conjunction with detection and provision of a wireless indication of a device mismatch, such as according to the methods of FIGS. 5-6, it may also be useful to provide techniques for receiving such indications and providing user notifications of such a device mismatch. FIG. 7 is a flowchart diagram illustrating such a method, in which a wireless device (such as the "third" wireless device described with respect to either or both of FIGS. 5-6) may receive an indication of a device mismatch and provide user notification of the device mismatch. The method of FIG. 7 may be implemented by a wireless user equipment (UE) device or other device capable of performing wireless communication. The method shown in FIG. 7 may be used in conjunction with any of the computer systems or devices shown in the above Figures, among other devices. Some of the method elements shown may be performed concurrently, in a different order than shown, substituted for by other elements, or may be omitted. Additional method elements may also be performed as desired. As shown, the method may operate as follows.

The wireless device may receive a wireless indication that a pair of wireless devices is mismatched (702). The wireless device may receive the wireless indication from one or both of the pair of wireless devices, for example in accordance with at least some aspects of the method of FIG. 5. Alternatively (or in addition), the wireless device may receive the wireless indication from another device (e.g., a storage device for a pair of wireless devices) on behalf of the pair of wireless devices, for example in accordance with at least some aspects of the method of FIG. 6.

The wireless indication may include any of various types of information. As one possibility, the wireless indication may explicitly specify that the pair of wireless devices are mismatched. For example, a mismatched devices advertisement payload could be used in a scenario in which the wireless indication is received via a BLE advertisement. As another possibility, the wireless indication may not explicitly indicate that the pair of wireless devices are mismatched, but may include information sufficient to allow the wireless device to determine that the pair of wireless devices are mismatched. For example, the wireless indication could include any of various identification information for the pair of wireless devices that may be indicative of a device mismatch between the pair of wireless devices, and the wireless device may determine that the pair of wireless devices are mismatched based at least in part on the received identification information.

In some instances, the wireless indication could include information received from different sources. For example, each wireless device of the pair of wireless devices could provide identification information for itself, and the wireless device could determine that the pair of wireless devices is mismatched from the combination of information received from the pair of wireless devices.

Note that the wireless indication may additionally include any of various other types of information, if desired, such as battery status information and/or other status information for the one or both of the pair of wireless devices.

The wireless device may further be able to determine a type of device mismatch based on the information received, at least in some instances. For example, the wireless device may be able to determine whether the pair of wireless devices are different generations of wireless devices. As another possibility, the wireless device may be able to determine whether the pair of wireless devices are associated with different users and/or owners, such as if one wireless device of the pair of wireless devices is associated with the wireless device and the other wireless device of the pair of wireless devices is not associated with the wireless device.

The wireless device may provide a user notification that the pair of wireless devices is mismatched (704). In some instances, the user notification may also include additional information about the device mismatch. For example, if the wireless device determines that the pair of wireless devices are of different product generations, the wireless device may provide user notification that the pair of wireless devices are of different product generations, and may possibly further indicate to which product generation each wireless device of the pair of wireless devices belongs. As another possibility, if the wireless device determines that the pair of wireless devices are associated with different users and/or owners, the wireless device may provide information relating to this as part of the user notification. For example, if one wireless device of the pair of wireless devices is associated with the wireless device and the other wireless device of the pair of wireless devices is not associated with the wireless device, such information could include an indication that one wireless device of the pair of wireless devices is not associated with the wireless device, and/or that only one wireless device of the pair of wireless devices is associated with the wireless device, and may possibly specify which of the pair of wireless devices is and is not associated with the wireless device.

The user notification may be provided via one or more user interface elements of the wireless device. For example, the user notification may include a textual or otherwise visual notification displayed on a display of the wireless device, an audio notification played on one or more speakers of the wireless device, and/or one or more other types of user notifications.

As another (e.g., alternative or additional) possibility, the wireless device may cause another device to provide the user notification, or a portion of the user notification. For example, if the pair of wireless devices is a pair of speakers (e.g., earphones, such as in previous examples described herein, or any other type of speakers), the wireless device could provide an audio notification via at least one wireless device of the pair of wireless devices. Such a technique may be useful to help distinguish between the mismatched pair of wireless devices, in some instances. For example, in a scenario in which the pair of wireless devices are of different product generations, the wireless device could play a sound via one of the pair of wireless devices and provide a visual notification via a display of the wireless device of on which product generation device the sound is being played. Similarly, in a scenario in which the pair of wireless devices are associated with different users and/or owners, the wireless device could play a sound via one of the pair of wireless devices and provide a visual notification via a display of the wireless device of the user/owner of the wireless device playing the sound. Note that other types of user notifications are also possible.

Note that the wireless communication described herein with respect to FIGS. 5-7 may include any of various types of wireless communication. For example, some or all of the wireless communications described with respect to FIGS. 5-7 may be performed via Bluetooth communication (or wireless communication that is based on Bluetooth wireless communication technology), near field communication (NFC), and/or any of various other types of (e.g., short range) wireless communication.

Note further that the various aspects of the methods of FIGS. 5-7 may be used independently or in conjunction with each other, as desired.

FIGS. 8-14

FIGS. 8-14 and the description thereof are provided by way of example, and are not intended to be limiting to the disclosure as a whole. Numerous alternatives to and variations of the details provided herein below are possible and should be considered within the scope of the present disclosure.

Figure 8:
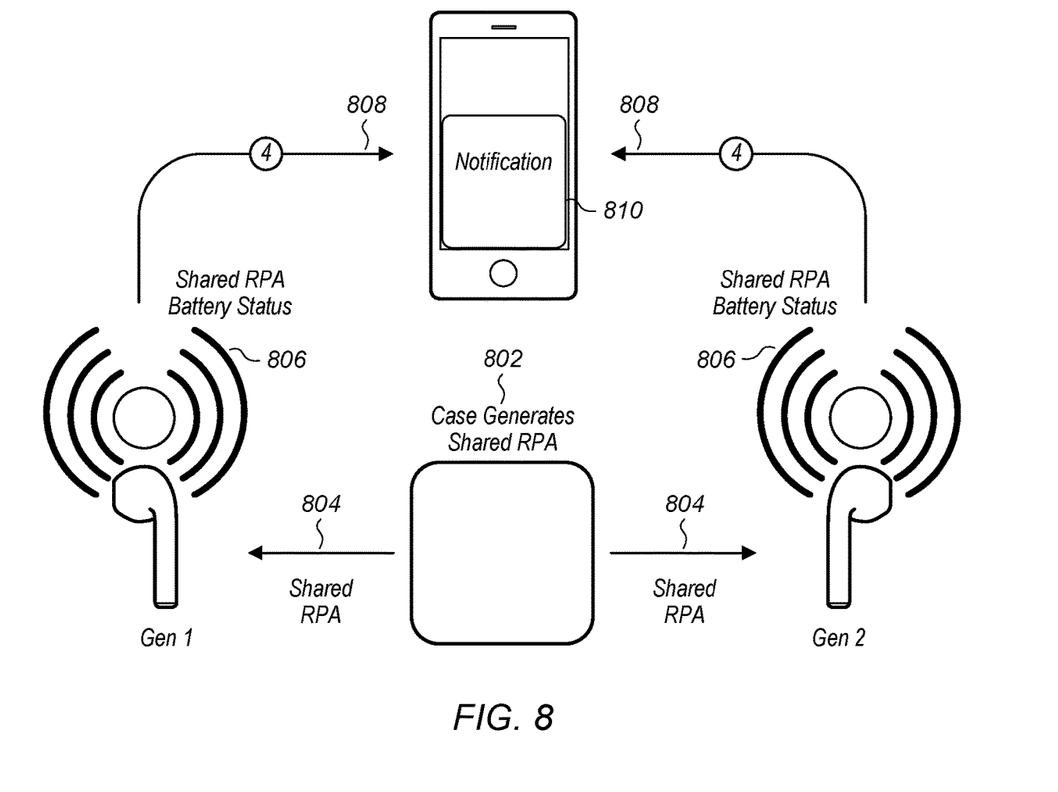
FIGS. 8-10 further illustrate exemplary aspects of possible methods for providing user notification of mismatched devices.

As previously noted herein, it may be useful to provide techniques for identifying when wireless device mismatches occur and facilitating resolution of such mismatches. FIG. 8 illustrates one possible approach to performing device mismatch identification and user notification in a scenario in which two wireless earphones of different product generations that have a similar appearance are placed in a smart storage case together.

In the illustrated scenario, when the earphones are placed into the case (or otherwise placed in physical proximity within a configured range), the case may generate a shared identifier for the two mismatched earphones, which may be referred to as a shared random public address (RPA) (802). The case may inform each earphone of the newly generated shared RPA (804). At certain times, the earphones may advertise the shared RPA, possibly along with other information about the earphones (e.g., battery status) (806). The shared RPA advertisements may be received by a smart phone, and may decode the advertisement contents (808). The smart phone may be able to determine from the advertisement contents that the earphones have been put in the case together (or otherwise placed in physical proximity within the configured range), and that they are mismatched and possibly incompatible with each other. Based on such a determination, the smart phone may provide a notification, e.g., to potentially assist a user of the smart phone to resolve the device mismatch (810).

Figure 9:
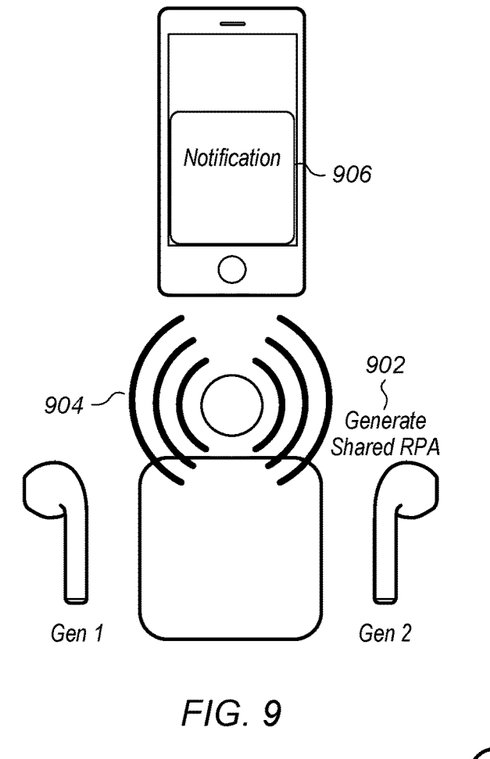

FIG. 9 illustrates another possible approach to performing device mismatch identification and user notification in a scenario in which two wireless earphones of different product generations that have a similar appearance are placed in a smart storage case together.

In the illustrated scenario, when the earphones are placed into the case (or otherwise placed in physical proximity within a configured range), the case may generate a shared identifier for the two mismatched earphones, which may be referred to as a shared random public address (RPA) (902). The case may inform each earphone of the newly generated shared RPA, and the case may also advertise the shared RPA, possibly along with other information about the earphones (e.g., battery status) (904). The shared RPA advertisements may be received by a smart phone, and may decode the advertisement contents. The smart phone may be able to determine from the advertisement contents that the earphones have been put in the case together (or otherwise placed in physical proximity within the configured range), and that they are mismatched and possibly incompatible with each other. Based on such a determination, the smart phone may provide a notification, e.g., to potentially assist a user of the smart phone to resolve the device mismatch (906).

Figure 10:
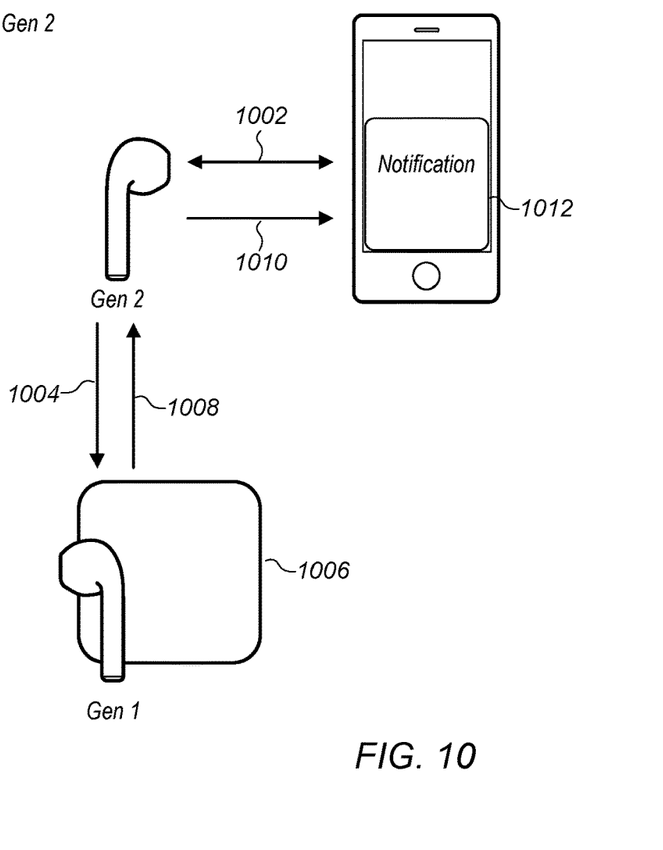

FIG. 10 illustrates a still further possible approach to performing device mismatch identification and user notification in a scenario in which two wireless earphones of different product generations that have a similar appearance are placed in a smart storage case together, and further in which one of the earphones has a connected link with a smart phone.

In the illustrated scenario, a generation 2 earphone may establish a connection with the smart phone (1002). When the generation 2 earphone is placed into the case (or otherwise placed in physical proximity within a configured range) with a generation 1 earphone (1004), the case may detect that the earphones are mismatched with respect to product generation (1006). The case may provide an indication to the generation 2 earphone that it is mismatched (1008). The generation 2 earphone may send a message to the smart phone indicating that it is being mismatched with the generation 1 earphone 1010). Based on the message, the smart phone may provide a notification of the device mismatch, e.g., to potentially assist a user of the smart phone to resolve the device mismatch (1012).

Figure 11:
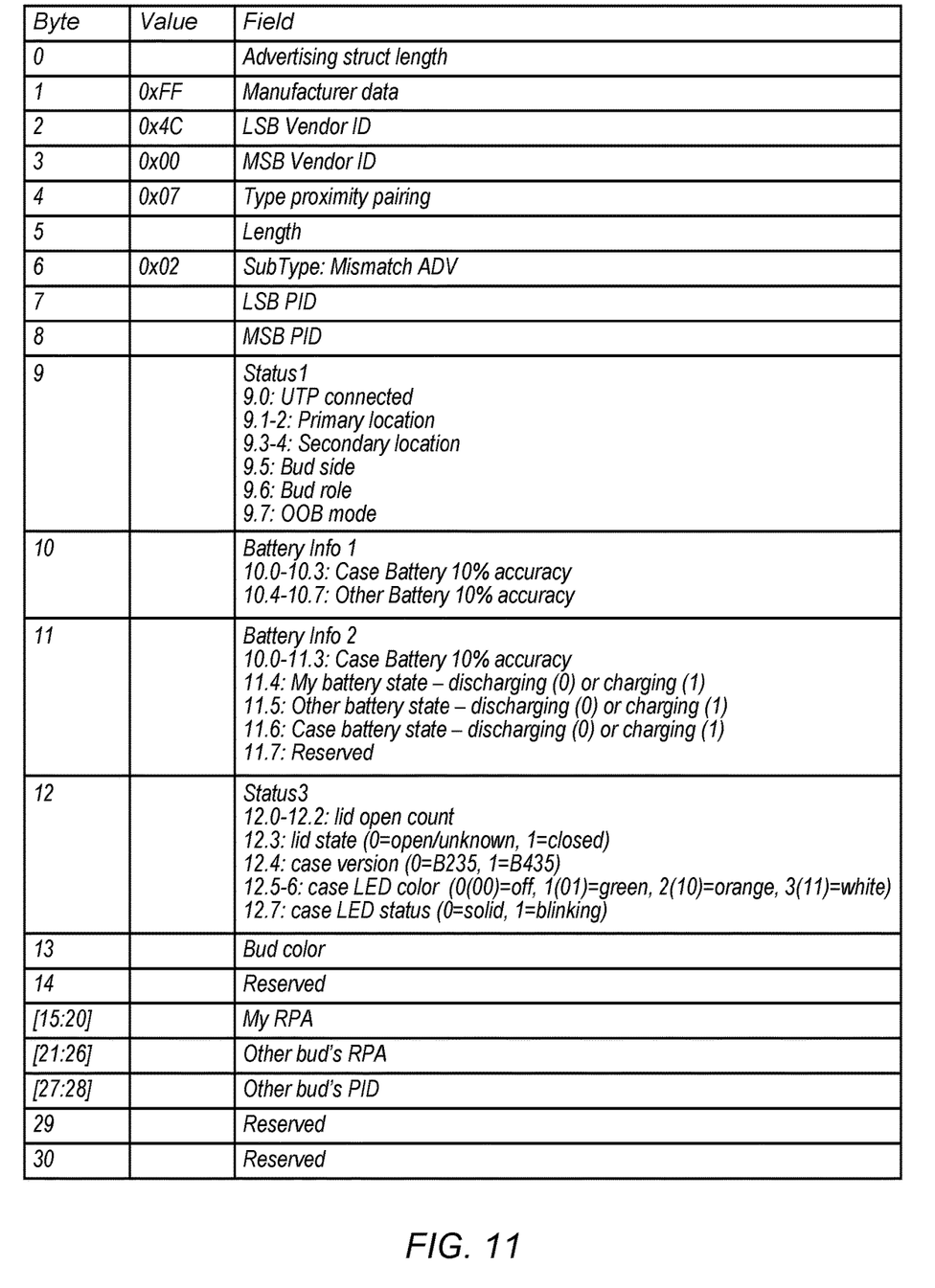
FIG. 11 illustrates an exemplary advertisement payload that could be used in conjunction with possible methods for providing user notification of mismatched devices.

FIG. 11 illustrates an example of a possible advertisement payload that could be used to provide an indication of a device mismatch. As shown, the example advertisement may include product identification (PID) information for an earphone (or "bud") and a paired earphone, as well as RPA information for the earphone and the paired earphone, and may further include advertisement type information indicating that the advertisement is a device mismatch advertisement, among various other possible types of information about the earphone and the paired earphone. In some instances, a shared RPA (e.g., in addition to individual RPA information for each device) may also be indicated as part of such an advertisement, e.g., in the header of the advertisement, as one possibility. Note that while the illustrated advertisement payload represents one possible set of information that could be used when providing an indication of a device mismatch, any number of other advertisement payloads are also possible.

Figure 12:
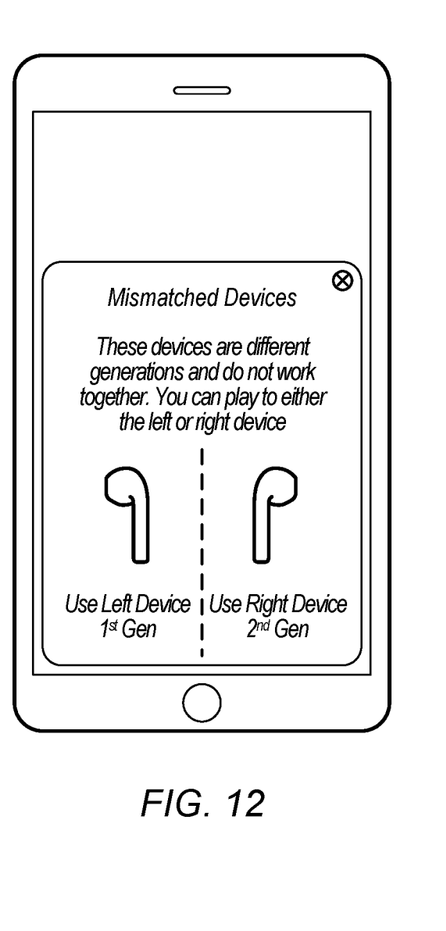
FIGS. 12-14 illustrate exemplary possible user notifications of mismatched devices that could be provided by a wireless device.
Figure 13:
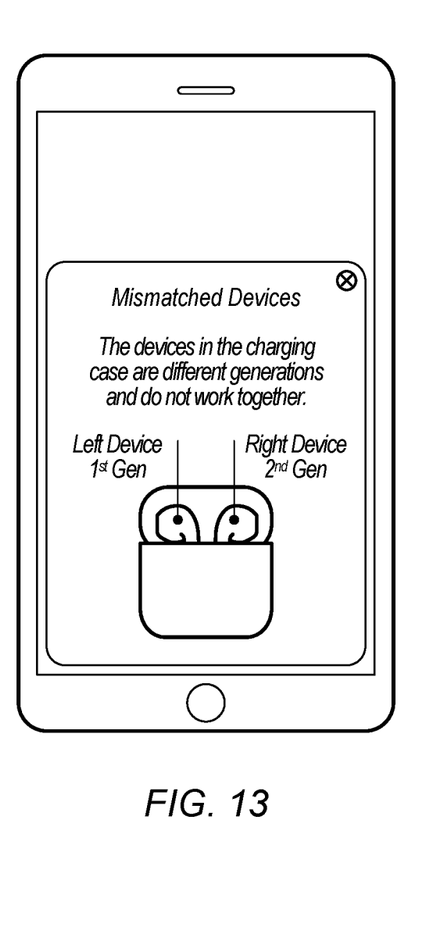
Figure 14:
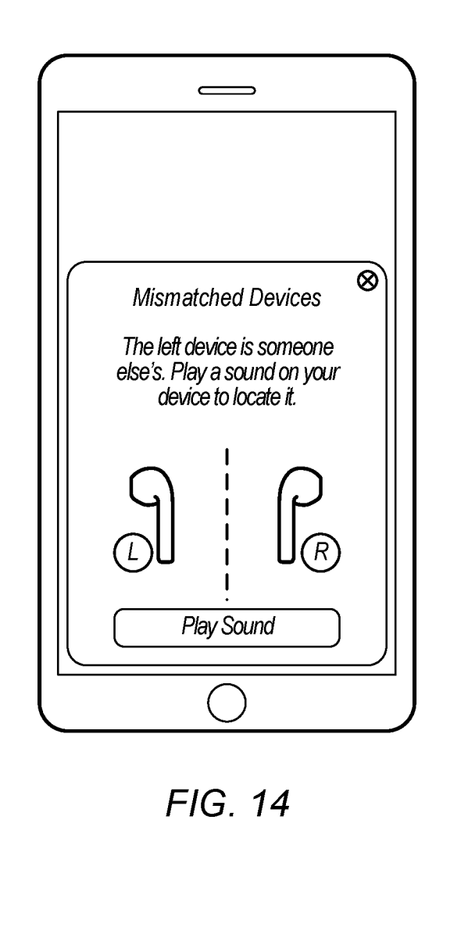

FIGS. 12-14 illustrate various examples of possible user notifications (or portions of user notifications) that could be provided to assist a user to resolve various device mismatch scenarios. For example, the user notification illustrated in FIG. 12 could be provided if a user attempts to use two earphones of different generations that are both owned by the user of the smart phone. In the illustrated example of FIG. 12, the smart phone may further present an option for the user to select which earphone the user would like to use, e.g., in case the earphones of different generations do not work together. The user notification illustrated in FIG. 13 could be provided if a user places two earphones of different generations that are both owned by the user of the smart phone into a charging case together. The user notification illustrated in FIG. 14 could be provided if a user attempts to use two earphones, of which only one is owned by the user of the smart phone, or if the user places two such earphones into a charging case together. In the illustrated example of FIG. 14, the smart phone may further present an option to the user to play a sound on the device owned by the user. Note that the illustrated user notifications are not intended to be limiting to the disclosure as a whole, and that any number of other user notifications are also possible.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a wireless device) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

While examples have been provided above that relate to Bluetooth, it should be understood that the techniques described herein may also be used, mutatis mutandis, in the context of any other appropriate wired or wireless communications technology, including but not limited to cellular, IEEE 802.11, Bluetooth Low Energy, or other technologies. Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A first wireless speaker, comprising:
an antenna;
a radio operatively coupled to the antenna; and
a processor operatively coupled to the radio;
wherein the first wireless speaker is configured to:
identify that the first wireless speaker is associated with a second wireless speaker;
determine that the first wireless speaker is mismatched with the second wireless speaker, wherein the first wireless speaker and the second wireless speaker cannot provide full functionality together; and
provide, to a third device, a wireless indication of the mismatch useable for providing a further indication that the first wireless speaker and the second wireless speaker cannot provide full functionality together.

2. The first wireless speaker of claim 1, wherein the first wireless speaker is configured to:
receive information indicating that the first wireless speaker is mismatched with the second wireless speaker based at least in part on the first wireless speaker and the second wireless speaker being located in proximity to a device configured to store a pair of wireless speakers,
wherein the wireless indication of the mismatch is provided based at least in part on the information indicating that the first wireless speaker is mismatched with the second wireless speaker.

3. The first wireless speaker of claim 2,
wherein the information indicating that the first wireless speaker is mismatched with the second wireless speaker comprises information received from the device configured to store a pair of wireless speakers.

4. The first wireless speaker of claim 2,
wherein the information indicating that the first wireless speaker is mismatched with the second wireless speaker comprises information that is wirelessly received by the first wireless speaker from the second wireless speaker.

5. The first wireless speaker of claim 2,
wherein the third device is associated with the device configured to store a pair of wireless speakers.

6. The first wireless speaker of claim 1,
wherein the wireless indication that the first wireless speaker is mismatched with the second wireless speaker comprises a mismatched devices advertisement payload comprising identification information for at least one of the first wireless speaker or the second wireless speaker.

7. A wireless device, comprising:
a radio; and
a processor operably coupled to the radio and configured to cause the wireless device to:
establish communication with a second device;
receive, from the second device, a notification that a first wireless speaker is mismatched with a second wireless speaker, wherein the first wireless speaker and the second wireless speaker cannot provide full functionality together; and
provide a further indication that the first wireless speaker and the second wireless speaker cannot provide full functionality together.

8. The wireless device of claim 7, wherein the notification comprises a Bluetooth advertisement transmission.

9. The wireless device of claim 7, wherein the further indication comprises a user notification.

10. The wireless device of claim 9, wherein the user notification indicates that one of the first wireless speaker or the second wireless speaker is not associated with the wireless device.

11. The wireless device of claim 9, wherein the user notification comprises a notification displayed on a display of the wireless device.

12. The wireless device of claim 9, wherein the user notification comprises an audio notification played on a speaker of the wireless device.

13. The wireless device of claim 7, wherein the second device is configured to store a pair of wireless speakers.

14. An apparatus, comprising:
a processor configured to cause a wireless device to:
establish communication with a second device;
receive, from the second device, a notification that a first wireless speaker is mismatched with a second wireless speaker, wherein the first wireless speaker and the second wireless speaker cannot provide full functionality together; and
provide a further indication that the first wireless speaker and the second wireless speaker cannot provide full functionality together.

15. The apparatus of claim 14, wherein the notification comprises a Bluetooth advertisement transmission.

16. The apparatus of claim 14, wherein the further indication comprises a user notification.

17. The apparatus of claim 16, wherein the user notification indicates that one of the first wireless speaker or the second wireless speaker is not associated with the wireless device.

18. The apparatus of claim 16, wherein the user notification comprises a notification displayed on a display of the wireless device.

19. The apparatus of claim 16, wherein the user notification comprises an audio notification played on a speaker of the wireless device.

20. The apparatus of claim 14, wherein the second device is configured to store a pair of wireless speakers.

* * * * *